(12) United States Patent
Tran et al.

(10) Patent No.: US 9,112,683 B2
(45) Date of Patent: Aug. 18, 2015

(54) MAINTAINING TRIGGERED SESSION STATE IN SECURE USER PLANE LOCATION (SUPL) ENABLED SYSTEM

(75) Inventors: Nguyen Khiem Tran, Sutherland (AU); Martin Wyville Thomson, Keiraville (AU); Darren Pawson, Flinders (AU)

(73) Assignee: MAPLE ACQUISITION LLC, Annapolis, MD (US)

( * ) Notice: Subject to any disclaimer, the term of this patent is extended or adjusted under 35 U.S.C. 154(b) by 373 days.

(21) Appl. No.: 13/101,243

(22) Filed: May 5, 2011

(65) Prior Publication Data

US 2011/0296184 A1 Dec. 1, 2011

Related U.S. Application Data

(60) Provisional application No. 61/348,788, filed on May 27, 2010.

(51) Int. Cl.
| | |
|---|---|
| *H04L 29/06* | (2006.01) |
| *H04L 9/08* | (2006.01) |
| *H04W 4/20* | (2009.01) |
| *H04W 80/08* | (2009.01) |

(52) U.S. Cl.
CPC .............. *H04L 9/088* (2013.01); *H04W 4/20* (2013.01); *H04L 2209/80* (2013.01); *H04W 80/08* (2013.01)

(58) Field of Classification Search
CPC .... H04W 4/02; H04W 76/022; H04W 80/085
USPC ......................................................... 713/170
See application file for complete search history.

(56) References Cited

U.S. PATENT DOCUMENTS

| | | | |
|---|---|---|---|
| 6,097,709 A | 8/2000 | Kuwabara | |
| 6,108,558 A | 8/2000 | Vanderspool, II | |
| 6,115,605 A | 9/2000 | Siccardo et al. | |
| 6,148,405 A * | 11/2000 | Liao et al. | 726/2 |
| 6,269,246 B1 | 7/2001 | Rao et al. | |
| 6,281,834 B1 | 8/2001 | Stilp | |
| 6,393,294 B1 | 5/2002 | Perez-Breva et al. | |
| 6,449,486 B1 | 9/2002 | Rao | |
| 6,591,112 B1 | 7/2003 | Siccardo et al. | |

(Continued)

OTHER PUBLICATIONS

Broadband Forum, "TR-069: CPE WAN Management Protocol v1.1", Dec. 2007, p. 22, http://www.broadbandforum.org/technical/download/Tr-069_Amendment-2.pdf.*

(Continued)

*Primary Examiner* — Mahfuzur Rahman
*Assistant Examiner* — John B King
(74) *Attorney, Agent, or Firm* — Tarolli, Sundheim, Covell & Tummino LLP (57) ABSTRACT

A method is provided for maintaining session state in a Secure User Plane Location (SUPL) enabled system during a triggered session. The method includes modifying at least one parameter of a session message to include state data indicating the session state, and transmitting a request to a SUPL Enabled Terminal (SET) to initiate the triggered session, the request comprising the session message having the at least one modified parameter to be stored at the SET. The method further includes receiving a triggered message from the SET in response to occurrence of a trigger event detected by the SET, the triggered message comprising the stored state data. The triggered session is identified using the state data received in the triggered message.

25 Claims, 4 Drawing Sheets

(56) References Cited

U.S. PATENT DOCUMENTS

| | | | |
|---|---|---|---|
| 6,782,265 | B2 | 8/2004 | Perez-Breva et al. |
| 6,944,465 | B2 | 9/2005 | Spain et al. |
| 7,116,987 | B2 | 10/2006 | Spain, Jr. et al. |
| 7,167,714 | B2 | 1/2007 | Dressler et al. |
| 7,233,799 | B2 | 6/2007 | Spain, Jr. |
| 7,250,907 | B2 | 7/2007 | Krumm et al. |
| 7,257,414 | B2 | 8/2007 | Spain, Jr. et al. |
| 7,383,051 | B2 | 6/2008 | Spain, Jr. et al. |
| 7,433,652 | B2 | 10/2008 | Durgin |
| 7,433,695 | B2 | 10/2008 | Gordon et al. |
| 7,460,505 | B2 | 12/2008 | Spain |
| 7,725,111 | B2 | 5/2010 | Dressler et al. |
| 7,734,298 | B2 | 6/2010 | Bhattacharya et al. |
| 7,753,278 | B2 | 7/2010 | Spain, Jr. et al. |
| 7,796,966 | B2 | 9/2010 | Bhattacharya et al. |
| 7,848,762 | B2 | 12/2010 | Gordon et al. |
| 7,899,467 | B2 | 3/2011 | Feuerstein et al. |
| 8,013,785 | B2 | 9/2011 | Bhattacharya et al. |
| 8,068,802 | B2 | 11/2011 | Bhattacharya et al. |
| 8,068,855 | B2 | 11/2011 | Dressler et al. |
| 8,106,817 | B2 | 1/2012 | Bhattacharya et al. |
| 8,106,818 | B2 | 1/2012 | Bhattacharya et al. |
| 8,155,394 | B2 | 4/2012 | Allegra et al. |
| 2004/0203539 | A1 | 10/2004 | Benes et al. |
| 2006/0173612 | A1* | 8/2006 | Steel .................... 701/207 |
| 2006/0225090 | A1* | 10/2006 | Shim et al. ............... 725/25 |
| 2006/0246919 | A1* | 11/2006 | Park et al. ............. 455/456.1 |
| 2007/0167177 | A1* | 7/2007 | Kraufvelin ............... 455/466 |
| 2007/0182547 | A1* | 8/2007 | Wachter et al. ........ 340/539.13 |
| 2008/0109650 | A1 | 5/2008 | Shim et al. |
| 2008/0113671 | A1* | 5/2008 | Ghozati et al. ........ 455/456.1 |
| 2010/0228846 | A1* | 9/2010 | Choi ..................... 709/223 |
| 2010/0311438 | A1 | 12/2010 | Edge et al. |
| 2011/0231561 | A1* | 9/2011 | Pawson et al. ............ 709/228 |

OTHER PUBLICATIONS

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

Open Mobile Alliance, "Secure User Plane Location Architecture," Candidate Version 2.0, OMA-AD-SUPL-V2_0-20091208-C (Dec. 8, 2009), pp. 1-54.

Open Mobile Alliance, "UserPlane Location Protocol," Draft Version 2.0, OMA-TS-ULP-V2_0-20100429-D (Apr. 29, 2010), pp. 1-406.

S. Josefsson, "The Base16, Base32, and Base64 Data Encodings," http://toolsietiorg/ html/rfc4648 (Oct. 2006), pp. 1-18.

Open Mobile Alliance, "UserPlane Location Protocol," Candidate Version 2.0 , OMA-TS-ULP-V2_0-20100816-C (Aug. 16, 2010), pp. 1-410.

* cited by examiner

MAINTAINING TRIGGERED SESSION STATE IN SECURE USER PLANE LOCATION (SUPL) ENABLED SYSTEM

PRIORITY STATEMENT

Priority is claimed from provisional patent application No. 61/348,788, filed May 27, 2010, in the United States Patent and Trademark Office, the disclosure of which is hereby incorporated by reference in its entirety.

BACKGROUND AND SUMMARY

This disclosure generally relates to location services in various wireless communication systems, such as Global System for Mobile communication (GSM), Code Division Multiple Access (CDMA), and Universal Mobile Telecommunication System (UMTS) networks. Further, this disclosure relates to user plane location approaches in core networks and complementary access networks.

Network operators are increasingly providing location services for determining estimated geographic locations or positions of mobile devices, such as cellular telephones, personal digital assistants (PDAs), and the like. Location determination may be performed, for example, using positioning measurements from Global Navigation Satellite System (GNSS) satellites (for mobile devices equipped with GNSS receivers) and/or terrestrial positioning systems. GNSS includes any satellite positioning system configured to provide geographic locations of receivers using a constellation of satellites, such as Global Positioning System (GPS), Global Navigation Satellite System (GLONASS), Galileo and COMPASS Navigation Satellite System (BeiDou). Terrestrial positioning systems may be based on any type of range measurements, such as uplink-time difference of arrival (U-TDOA) or timing advance (TA) measurements (e.g., in GSM networks), round-trip time (RTT) measurements (e.g., in UMTS networks), enhanced observed time difference (E-OTD) measurements, angle of arrival (AoA) measurements, power of arrival (POA) measurements, WiFi measurements, DTV signals and the like.

The estimated location of a mobile device may be determined based on certain predetermined conditions, referred to as "conditional triggers." Conditional triggers may correspond to occurrence of various trigger events, such as the mobile device entering or leaving a specified area, or the passing of a specified period of time. Position data is then provided by the mobile device and/or the location of the mobile device is determined upon occurrence of one or more of the trigger events.

Various protocols have been developed to enable communication with mobile devices, including Secure User Plane Location (SUPL) protocol of the Open Mobile Alliance (OMA), as described, for example, in "Secure User Plane Location Architecture," Candidate Version 2.0, OMA-AD-SUPL-V2_0-20091208-C (Dec. 8, 2009), the subject matter of which is hereby incorporated by reference. SUPL provides location services through the user plane, enabling the transfer of position data from a mobile device, referred to as a SUPL Enabled Terminal (SET), over a user plane bearer, such as internet protocol (IP), for determination of the geographical location of the SET. The SUPL protocol defines a Location User Plane (Lup) Reference Point and corresponding interface between a SUPL Location Platform (SLP) and the SET, as well as various security and privacy functions. A UserPlane Location Protocol (ULP) is a protocol-level instantiation of the Lup Reference Point, used between the SLP and the SET, as described, for example, in "UserPlane Location Protocol," Draft Version 2.0, OMA-TS-ULP-V2_0-20100429-D (Apr. 29, 2010), the subject matter of which is hereby incorporated by reference.

SUPL enables a client of a location service to request notification of the location of a SET in response to conditional triggers, as discussed above. For example, a conditional trigger may correspond the SET entering or leaving a specified region or occurrence of a specified time or time interval. As discussed above, the location of the SET may be determined, for example, by a server or other network node, using positioning measurements from GNSS satellites received by a GNSS receiver of the SET, and/or using positioning measurements from terrestrial positioning systems. Generally, the SLP is responsible for establishing and maintaining the conditional triggers in the SET, which then acts autonomously to detect the trigger events that meet the conditions of the conditional triggers. Once a trigger event is detected, the SET contacts the SLP, the position of the SET is determined, and the location client is notified of the location of the SET.

Conventional SUPL designs require one or more SLP nodes of the SLP to maintain the state necessary to identify the triggered session and to implement the conditional trigger and corresponding location determination. Since the SLP manages numerous SETs, the SLP must maintain numerous corresponding triggered session states. Even with modern storage capacities, this represents a challenge for the SLP from the state persistence perspective.

In a representative embodiment, a method is provided for maintaining session state in a Secure User Plane Location (SUPL) enabled system during a triggered session. The method includes modifying at least one parameter of a session message to include state data indicating the session state; transmitting a request to a SUPL Enabled Terminal (SET) to initiate the triggered session, the request including the session message having the at least one modified parameter to be stored at the SET; and receiving a triggered message from the SET in response to occurrence of a trigger event detected by the SET, the triggered message including the stored state data. The triggered session is identified using the state data received in the triggered message.

In another representative embodiment, a computer readable medium is provided for storing code executable by a computer processor for maintaining session state in a SUPL enabled system during a triggered session. The computer readable medium includes modifying code segment, transmitting code segment, receiving code segment, and identifying code segment. The modifying code segment is for modifying at least one parameter of a session message to include state data indicating the session state. The transmitting code segment is for enabling transmission of a request to a SET to initiate the triggered session, the request including the session message having the at least one modified parameter to be stored at the SET. The receiving code segment is for receiving a triggered message from the SET in response to occurrence of a trigger event detected by the SET, the triggered message including the stored state data. The identifying code segment is for identifying the triggered session using the state data received in the triggered message.

In another representative embodiment, a method is provided for maintaining session state in a SUPL enabled system during a triggered session, without a SUPL Location Platform (SLP) maintaining state necessary to identify the triggered session, The method includes setting free bits of a SlpSessionID parameter in a session message to include state data indicating the session state; transmitting the session message to a SUPL Enabled Terminal (SET) to initiate the triggered session, the SET storing the free bits of the SlpSessionID; receiving a SUPL POS INIT message from the SET upon occurrence of a trigger event to initiate position determination as part of the triggered session, the SUPL POS INIT message comprising the stored state data; identifying the triggered session using the stored state data in the SUPL POS INIT message; and exchanging SUPL POS messages with the SET, with at least one SUPL POS message including position data indicating a location of the SET. An estimated position of the SET is calculated using the position data in the SUPL POS message.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Figure 1:
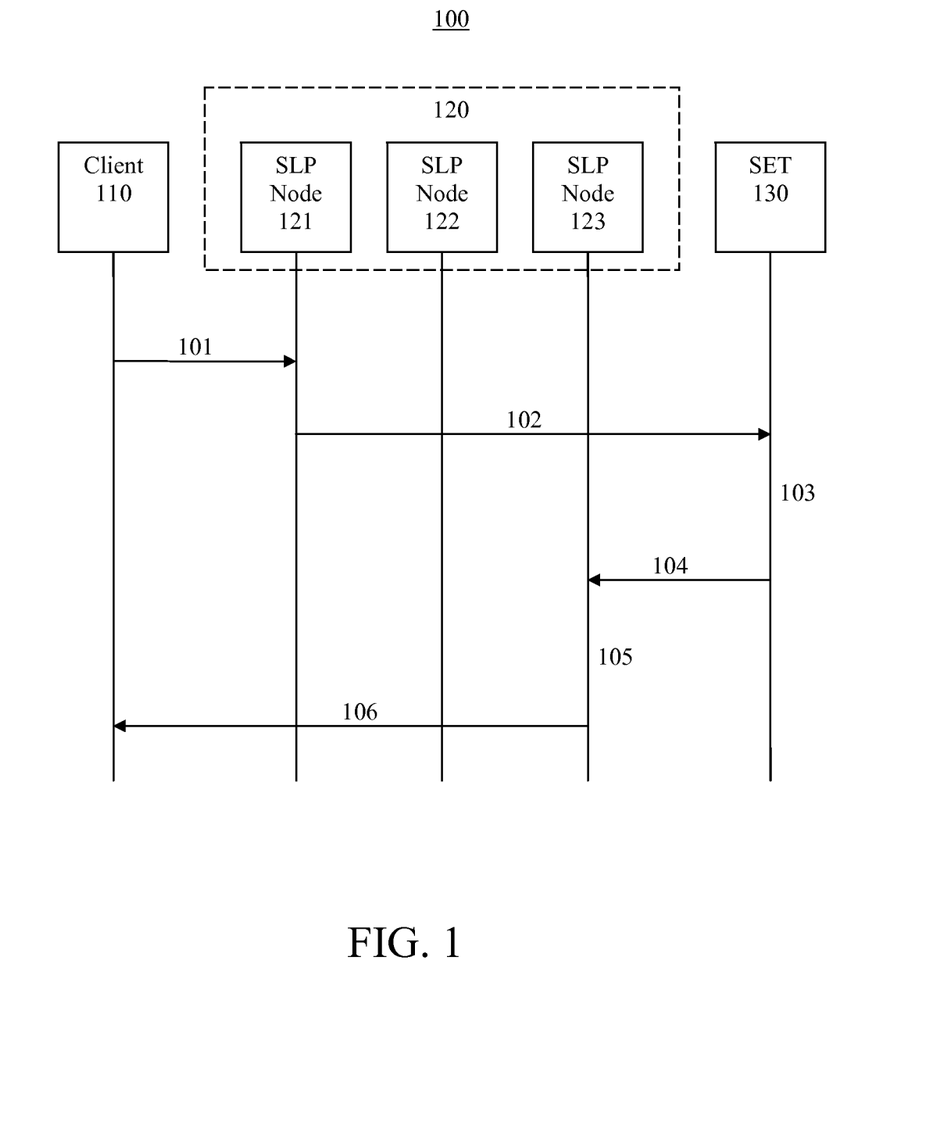
FIG. 1 is a call flow diagram illustrating a procedure for establishing and maintaining a triggered session for location determination of a mobile device based on a conditional trigger, according to a representative embodiment.

FIG. 1 is a call flow diagram illustrating a procedure for establishing and maintaining a triggered session for location determination of a mobile device based on a conditional trigger, according to a representative embodiment.

Referring to FIG. 1, wireless communications network 100 has SUPL architecture, and includes location client 110, SUPL Location Platform (SLP) 120 and representative SUPL Enabled Terminal (SET) 130. The location client 110 may be a location server, for example, implemented by a third party, such as a network operator or a service provider. In various illustrative implementations, the location client 110 may be included a mobile location center (MLC) server in the wireless communication network, such as a gateway mobile location center (GMLC) or a serving mobile location center (SMLC) in a GSM network or a stand-alone SMLC (SAS) in a UMTS network, for example. The SET 130 is a mobile device, such as a cellular telephone, a PDA, a laptop or other portable computer, or the like. In various implementations, the location client 110 may be included in the SET 130, in which case the SET 130 requests and receives its own location, e.g., in response to conditional triggers.

In the depicted embodiment, the SLP 120 includes clustering of multiple nodes for scaling and availability purposes, such that a load-balancing system distributes incoming requests to individual nodes. The multiple nodes are depicted as representative SLP nodes 121-123, each of which may process a subset of requests. The SLP nodes 121-123 may be separate servers, e.g., grouped at a single location or distributed over separate geographic locations to cover different territories. For example, the SLP nodes 121-123 may be co-located with a GMLC in the 3GPP core network; an SMLC, base stations and/or a base station controller (BSC) in a GSM network or with a SAS, Node Bs and/or a radio network controller (RNC) in a UMTS network.

At step 101 in FIG. 1, the location client 110 initiates a session with the SET 130 through the SLP node 121 of the SLP 120, which may be a home-SLP (H-SLP) or a visited-SLP (V-SLP). The session may be a "triggered session," according to which the location client 110 requests triggered reports of the location of the SET 130 based on one or more conditional triggers. For example, in order to initiate the triggered session, the location client 110 may send a mobile location protocol (MLP) triggered location reporting request (tlrr) to the SLP node 121, identifying the SET 130 and specifying one or more conditional triggers. The SLP node 121 may authenticate the location client 110 and determine whether it is authorized for the requested triggered session. The conditional trigger may be location based, where the corresponding trigger event is the SET 130 leaving or entering a particular geographic region. Also, the conditional trigger may be time based, where the corresponding trigger event is a time of day or a predetermined time interval. Other types of conditional triggers may be implemented, and more than one conditional trigger may be specified, without departing from the scope of the present teachings. Although FIG. 1 depicts the triggered session being initiated through the SLP node 121, for purposes of illustration, it is understood that the triggered session may be initiated through any one of the SLP nodes 121-123, depending on various factors, such as the respective work load of the SLP nodes 121-123, the geographic location of the location client 110 and/or the SET 130, available memory, and the like. As mentioned above, a load-balancing system may perform the distribution among the SLP nodes 121-123. Notably, the location client 110 and/or the SET 130 may perform load balancing themselves in different ways, but a highly available load balancer may be incorporated.

The SLP node 121 initiates the triggered session with the SET 130 at step 102. For example, the SLP node 121 may send a SUPL INIT message to the SET 130, identifying the location client 110 and specifying the conditional trigger. In an embodiment, a handshake may be performed (not shown) between the SET 130 and the SLP node 121. For example, the SET 130 may send a SUPL TRIGGERED START message to the SLP node 121 to start the triggered session, and the SLP node 121 may respond with a SUPL TRIGGERED RESPONSE message.

Once the triggered session has been initiated, the SET 130 monitors for occurrence of the trigger event corresponding to the conditional trigger at step 103. For example, the SET 130 may be configured to compare its current position (e.g., by position estimate or presence within a particular cell) with a target geographic region, so that it is able to determine when it enters and/or leaves the target geographic region. Likewise, the SET 130 may be able to compare the current time with a predetermined target time of day or time interval.

Once the occurrence of the trigger event is detected, the SET 130 sends a triggered message to SLP node 123 at step 104. For example, the triggered message may be a SUPL POS INIT message, which includes the identity of the SET 130. This occurs when the SET 130 initiates location determination procedures, and accordingly sends a SUPL POS INIT, followed by an exchange of one or more SUPL POS messages, which include position data of the SET 130. Alternatively, or in addition, the triggered message may be a SUPL REPORT message, for example, and may include the identity of the SET 130, the time of occurrence of the trigger event, and the position data. This occurs once a final location of the SET 130 has been calculated and the trigger is deemed to have been met.

In the depicted embodiment, the position data include positioning measurements that enable the position estimate of the SET 130, at the time of occurrence of the trigger event, to be calculated by the SLP node 123 in step 105. For example, when the SET 130 incorporates a GPS receiver, the position data may include pseudo-ranges measured between the SET 130 and multiple GPS satellites. In an alternative embodiment, the position data may indicate the actual position estimate (geographic location) of the SET 130 at the time of occurrence of the trigger event, when the SET 130 has the capability to perform this calculation itself. For purposes of illustration, the SLP node 123 is assumed to be the SLP node servicing the SET 130 at the time the trigger event occurs, although it is understood that the triggered message may be sent to any one of the SLP nodes 121-123 with which the SET 130 is able to communicate.

As mentioned above, when the triggered message or a message subsequent to the triggered message includes the position data (e.g., SUPL REPORT or SUPL POS messages), the SLP node 123 retrieves the position data from the triggered message and calculates the position estimate of the SET 130 using any GNSS and/or terrestrial positioning calculation technique at step 105. The SLP node 123 sends calculated the position estimate of the SET 130 to the location client 110 at step 106. For example, the SLP node 123 may send an MLP triggered location report (fir) to the location client 110, which includes the position estimate.

Sending the position estimate does not necessarily end the triggered session, as multiple trigger events may occur over an extended triggered session. For example, the triggered session may be a long running or extended triggered session (e.g., up to 100 days). Between occurrences of trigger events, the communication channel between SET 130 and the SLP 120 may be closed to preserve resources. Either the SET 130 or the SLP 120 may resume communications related to the long running triggered session. For example, a 32-bit identifier, referred to as sessionID, may be used to identify the triggered session when resuming communications.

As mentioned above, in accordance with the SUPL protocol, the session state must be maintained both to identify the triggered session and to continue the triggered session. Typical session state data is tabulated in Table 1, below:

TABLE 1

| State Information | Type | Maximum Size (Bytes) |
| --- | --- | --- |
| Session Type | Triggered/Periodic/Basic/etc. | 1 |
| SET identifier | Varies, MSISDN (most common) is 15 digits | 8 |
| Client URL | Unconstrained (but can be limited) | 100 |
| Request ID | Constructed by SLP | 12 |
| Start Time | Date and time | 8 |
| Rate | Time interval | 2 |
| End Time | Date and time | 8 |
| Report Count | Integer | 2 |
| Max Reports | Integer | 2 |
| SUPL INIT HMAC | 64 bits from 256-bit output of HMAC function using SHA-256 | 8 |
| Total Size | | 151 |

Conventionally, the SET 130 maintains state only for a small number of its own triggered sessions, so its state data does not represent a significant imposition on even limited resources. On the other hand, the SLP 120 maintains triggered session states for a large number of SETs, including the SET 130. For example, for triggered sessions to work, all of the SLP nodes 121-123 in the SLP 120 must have access to the state data necessary to continue the triggered session. The load balancing system could be given sufficient information to redirect requests in a way that ensures that requests for the same triggered session are always directed to the same servicing SLP node 121-123. However, in a highly available system, the design must allow for failure of current servicing SLP node 121-123 over the lifetime of the triggered session, particularly a long-lived trigger session. Session state may be moved to a shared resource, like a database. However, this may introduce a single point of failure, which would result in all the SLP nodes 121-123 in the SLP 120 being unable to access the necessary state data. Redundant, highly available database systems may avoid this problem, but can be costly and difficult to implement.

Thus, according to various embodiments, to avoid the SLP 120 and/or a shared resource from having to maintain state, the SLP state data is provided to the SET 130, e.g., when the SLP node 121 initiates the triggered session with the SET 130 at step 102. The state data includes information for establishing and re-establishing communications with the SET 130, such as the SET identifier. The SET 130 stores the state data, along with its own state information.

In order to provide the state data to the SET 130, the SUPL session messaging is modified to include the state data. In an embodiment, every request made in relation to the triggered session shares a number of parameters, which are echoed verbatim by the SET 130. Nominally, these parameters are used to provide the SET 130 with the ability to correlate a request with the state data that it stores, but there are sufficient free bits in the messaging fields which may be used more directly.

Representative parameters of session messaging, e.g., included in the SUPL INIT message sent by the SLP node 121 to the SET 130 in step 102, according to ULP, are as follows:

```
SlpSessionID : : = SEQUENCE {
    sessionID    OCTET STRING (SIZE (4)),
    slpId        SLPAddress}
SLPAddress : : = CHOICE {iPAddress IPAddress,
                         fQDN       FQDN,
                         ...}
```

-continued

```
FQDN : : =
    VisibleString (FROM ("a".."z" | "A".."Z" | "0".."9" | ".-"))
    (SIZE (1..255))
```

As indicated above, the SlpSessionID parameter has a total size of 259 characters, and includes a sessionID field and a slpID field. The sessionID field contains a 32-bit session identifier (ID), indicated as an octet string, which is unique with respect to all concurrently active ULP sessions on the servicing SLP (e.g., one of SLP nodes 121-123), and the slpID field contains a text string that nominally identifies the servicing SLP. The slpID field is indicated as the SLPAddress parameter, which may include an IP address or fully qualified domain name (FQDN) to give the SLP 120 an easy way of identifying the servicing SLP node 121-123 in the cluster, and thus identifies the originator and/or controller of a particular triggered session.

The SlpSessionID parameter includes a number of free bits, which are not used in the sessionID field and/or the slpID field. In particular, there are 64 different possible values for each of the 255 characters of the SlpSessionID parameter, since there are 6 bits per character of freely usable entropy. If some simple constraints are placed on the state data, the state data can be compressed to fit in the available space. For example, modified base64 encoding may be used to fit up to 191.25 bytes of data (255*3/4) in the SLPAddress parameter, or 1,530 bits. An example of base64 encoding is described in RFC 4648, "The Base16, Base32, and Base64 Data Encodings," http://tools.ietf.org/html/rfc4648 (October 2006), the subject matter of which is hereby incorporated by reference. Adding the 32 bits of the sessionID field means that there are 195.25 bytes of data, or 1,562 bits, available to the SLP 120 for providing state data to the SET 130 using the SlpSessionID parameter. Although the SlpSessionID parameter is discussed in detail, it is understood that other parameters and/or fields of ULP may be used to communicate the state data to the SET 130, and/or to compress or reduce the amount of state data, without departing from the scope of the present teachings.

The free bits in the SlpSessionID parameter are set by the SLP 120. For example, the SLP 120 may define a fixed structure for the necessary state data. Based on this structure, bits are extracted six at a time and converted to a character in the slpID field based on a fixed mapping. For instance, 000000→a, 000001→b, 000010→c, etc. The resulting slpID is sent to the SET 130 in step 102 of FIG. 1 to cause the SET 130 to store all of the necessary state data for the triggered session. The SLP 120 itself therefore does not have to store state data or otherwise maintain state at all. The necessary state data is then provided by the SET 130 in the SlpSessionID parameter in a triggered message in response to a trigger event, when the SET 130 subsequently contacts the SLP 120 in step 104 of FIG. 1.

As mentioned above, the SET 130 may exchange positioning messages (e.g., SUPL POS messages) with the SLP 120 prior to sending a triggered report (e.g., between steps 102 and 103), where the positioning messages likewise contain the SlpSession ID parameter, and thus the state data encoded therein. Also, when the SLP 120 is clustered, as shown in FIG. 1, it no longer matters which SLP node (e.g., SLP nodes 121-123) serves an individual request since the state data will be provided to whichever SLP node 121-123 with which the SET 130 communicates.

Notably, storing session state data only on the SET 130 presents a potential security risk. For example, the SET 130, when aware of this mechanism, may exploit the stored session state data in various ways. Because the SET 130 holds the only copy of the state data, it would be able to alter the session state data as it chooses. Storing state data as plain text therefore is not viable. Some form of integrity protection is necessary. For example, the state data can be integrity protected by a message authentication code (MAC) or, where confidentiality is also desirable, a combination of a checksum or hash and encryption.

Figure 2:
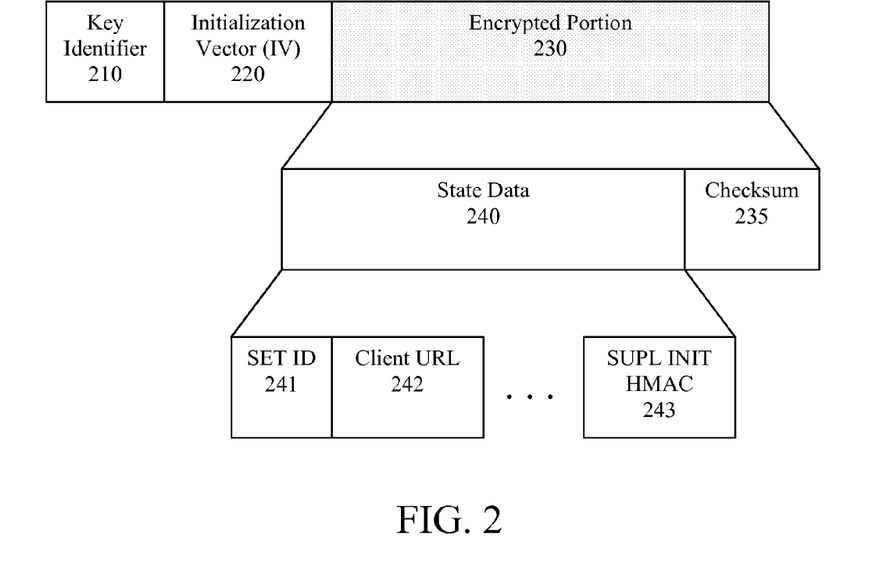
FIG. 2 is a block diagram showing an illustrative format of state data in which the data is encrypted, according to a representative embodiment.

FIG. 2 is a block diagram showing an illustrative format of state data, in which the state data is encrypted, according to a representative embodiment.

In the format depicted in FIG. 2, the state data format includes key identifier 210 and initialization vector (IV) 220, which are not encrypted, and encrypted portion 230, which includes state data 240 and checksum 235. The state data 240 is the data needed to identify and continue a triggered session. For example, the state data 240 may include the data shown in FIG. 1, such as SET ID 241, client URL 242, and SUPL INIT HMAC 243, which are shown for purposes of illustration. The key identifier 210 is used to identify an encryption key that is stored by all of the SLP nodes 121-123. This allows for the encryption key to be changed periodically. The IV 220 is used to establish an initial state for the cipher. For example, a block cipher, such as Advanced Encryption Standard (AES), may be used, although other types of ciphers and/or encryption may be incorporated without departing from the scope of the present teachings. Use of a block cipher limits the effectiveness of some cryptanalysis attacks.

In the encrypted portion 230, the SET ID 241 provides identification of the SET 130, such as an IP address or a Mobile Station Integrated Services Digital Network (MSISDN) number, and the client URL 242 provides identification of the location client 110. The checksum 235 is calculated over the combined state data 240, and prevents the SET 130 from modifying the encrypted portion 230. Alternatively, a cryptographic hash or hash-based message authentication code (HMAC), such as HMAC-64, may be included, although this is not necessary since the SET ID 241 and the client URL 242, as well as the other state data 240, are encrypted. With a block size of 128 bits, for example, at most 12 blocks can be enciphered, leaving 26 bits free for the key identifier 210 and the IV 220. A 128-bit IV 220 would leave 11 blocks or (176 bytes) for the state data 240, less the size of the checksum 235, which may require up to 16 bits, for example.

Figure 3:
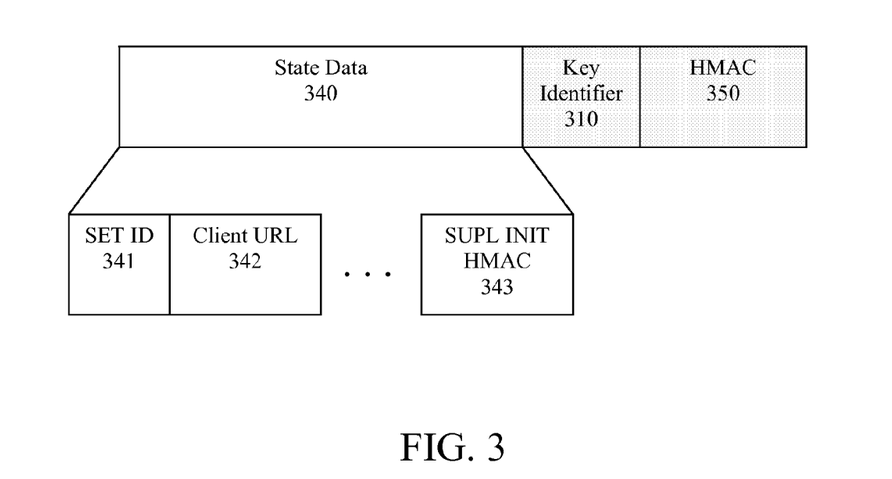
FIG. 3 is a block diagram showing an illustrative format of state data in which the data is not encrypted, according to another representative embodiment.

FIG. 3 is a block diagram showing an illustrative format of state data, in which the state data is not encrypted, according to another representative embodiment.

In the format depicted in FIG. 3, the state data format includes unencrypted state data 340, which may include SET ID 341, client URL 342, SUPL INIT HMAC 243, and other data from Table 1, which are unencrypted but otherwise substantially the same as the SET ID 241, the client URL 242, and the SUPL INIT HMAC 243, discussed above. The state data format of FIG. 3 further includes an encrypted key identifier 310 and HMAC 350. The HMAC 350 is calculated over the combined state data 340 and key identifier 310, and provides a message authentication code using a cryptographic hash function and corresponding cryptographic key, e.g., identified by the key identifier 310. Because of the HMAC 350, it does not matter whether the SET 130 sees the (unencrypted) state data 340. That is, as long as the HMAC 350 is generated with an encryption key that is known only to the SLP nodes 121-123, the state data cannot be changed without the SLP nodes 121-123 knowing. In other words, without the key (which is identified by the key identifier 310), the SET 130 can see the state data 340, but is unable to generate state that would be considered valid by the SLP 120. Again, the key identifier 310 may be used to enable rotation of the encryption key.

The encryption approach depicted in FIG. 3 has approximately the same cost in bytes as the encryption approach depicted in FIG. 2, depending on the hashing algorithm used. For example, the HMAC 350 may use a Secure Hash Algorithm (SHA), such as SHA-1, which is a 160-bit hash function, or SHA-256, which is a 256-bit hash function. Fewer bits may be included at the cost of weakening the assurance that the contents of the state data will not be modified.

The SUPL protocol provides the location client 110 the ability to cancel a triggered session. For example, the location client 110 may identify the triggered session using the Request ID shown in Table 1 (which may be referred to as req_id). The Request ID is created by the SLP 120 and provided to the location client 110 in the SUPL INIT message sent in step 102 of FIG. 1, so it may be used to store the information necessary to cancel a request.

More particularly, the SLP 120 may store the SET Identifier (e.g., identifying the SET 130) in the Request ID, along with parameters that uniquely identify the triggered session. The Request ID is provided by the location client 110 to the SLP 120, e.g., in a MLP triggered location reporting stop request (tlrsr) message, when it requests that the triggered session be cancelled. Using the SET Identifier, the SLP 120 is able to contact the SET 130. A session info query, using a new session, is sent by the SLP 120 to the SET 130, e.g., in a SUPL INIT message. In response, to the session info query, the SET 130 sends a SUPL REPORT message that includes information on all the triggered sessions that are open on the SET 130. The triggered session that contains a matching Request ID is then be selected and cancelled.

A limitation involved with storing state data on the SET 130 is that the state data stored by the SET 130 is immutable. In other words, the state cannot change. Therefore, features such as limiting the number of uses of the triggered session are not possible. This exposes the SLP 120 (and/or the location client 110) to denial of service through triggered reporting. Because the SLP 120 does not have the state data for the triggered session, it is unable to track repeated reports. The SET 130 could generate reports at a high rate, overwhelming SLP 120 or the location client 110 with reports, effectively causing a denial of service (DOS) attack. The number and frequency of reports is not tracked for each triggered session. Thus, in various embodiments, the SLP 120 may maintain short-lived (and per-node) state to prevent this sort of DOS attack. Accordingly, the SLP 120 still does not have to maintain long-lived state, but DOS attacks are limited.

Figure 4:
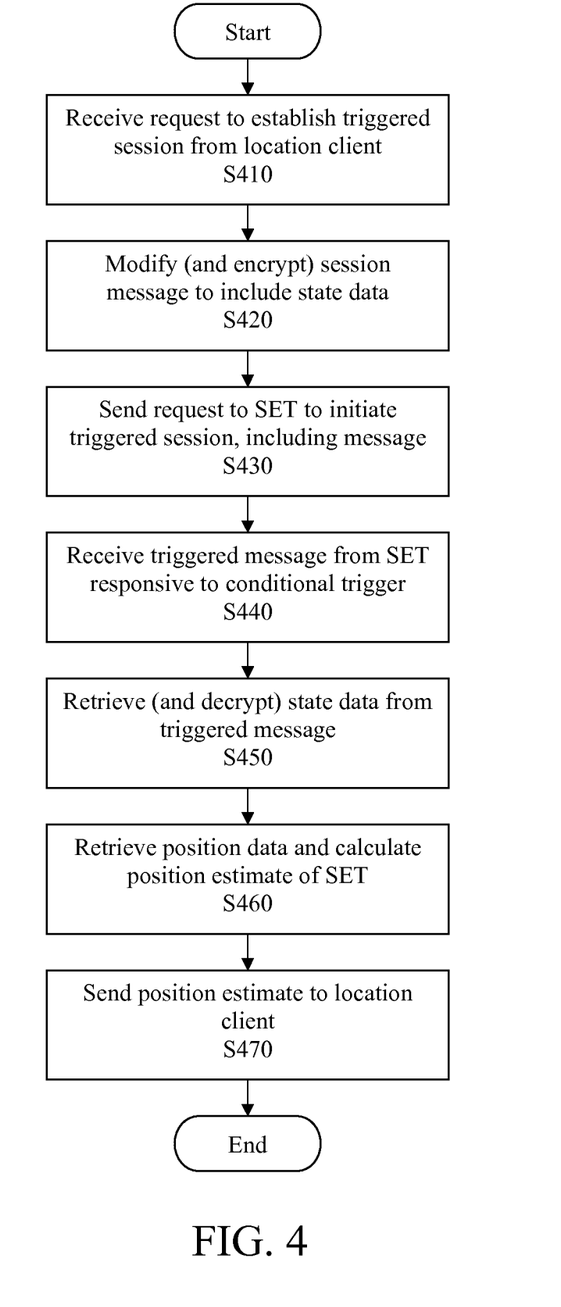
FIG. 4 is a flowchart illustrating a method for establishing and maintaining a triggered session for location determination of a mobile device based on a conditional trigger, according to a representative embodiment.

FIG. 4 is a flowchart illustrating a method for establishing and maintaining a triggered session for location determination of a mobile device based on a conditional trigger, according to a representative embodiment. The process of FIG. 4 may be executed, for example, by one or more servers corresponding to the SLP nodes 121-123 of the SLP 120, depicted in FIG. 1.

In block S410, the SLP 120 (via one of the SLP nodes 121-123) receives a request for a triggered session with respect to a mobile device (e.g., SET 130). The request may be initiated by any of a variety of sources, and received over voice/data communication channels and/or signaling channels. For example, referring to FIG. 1, the request may be a MLP triggered location reporting request (tlrr) message received from the location client 110. In response, the SLP 120 modifies a session message to include state data in block S420, and sends a request for a trigger session to the SET 130 in block S430, where the request includes the modified session message. For example, the session message may be a SUPL INIT message having a SlpSessionID parameter, and thus modifying the session message includes setting free bits of the SlpSessionID parameter to include the state data, as discussed above. In various embodiments, the state data and/or a key identifier associated with the state data may be encrypted, as discussed above with reference to FIGS. 2 and 3, so that the state data may not be altered by the SET 130, which is unable to decrypt the state data and/or the key identifier. The request may be transmitted by the SLP 120 over voice/data communication channels and/or signaling channels.

The SET 130 receives and stores the state data in order to maintain state for the triggered session. The triggered session includes one or more conditional triggers that have corresponding trigger events, such as the SET 130 entering or leaving a specified geographic region, occurrence of a time of day, or the passing of a specified time interval. Upon occurrence of a trigger event, the SET 130 generates a triggered message, which may include the identity of the SET 130, the time of occurrence of the trigger event, and position data indicating the location of the SET at the time the trigger event occurs, for example. As discussed above, the position data may include positioning measurement information from which another device (e.g., the SLP 120) can calculate the estimated position of the SET 130, or an actual estimated position of the SET 130 as calculated by the SET 130 itself. For example, when the SET 130 includes a GNSS receiver, the GNSS receiver locks on to and receives signals from at least four GNSS satellites. The received signals may include navigation messages, for example, providing ephemeris data and timing signals, enabling the GNSS receiver to generate the positioning measurement information.

The triggered message is received from the SET 130 by the SLP 120 in block S440, e.g., over voice/data communication channels and/or signaling channels, responsive to the one or more conditional triggers. In block S450, the state data is retrieved from triggered message by the SLP 120. The SLP 120 validates the integrity of the state data when it is received, rejecting any invalid state. When the state data or the key identifier is encrypted, the SLP 120 also performs the appropriate decryption process. Once the SLP 120 has the state data, it retrieves the position data from the triggered message (or from subsequent SUPL POS messages) and calculates the position estimate of SET in block S460. The position estimate is then sent to the location client 110 in block S470.

Figure 5:
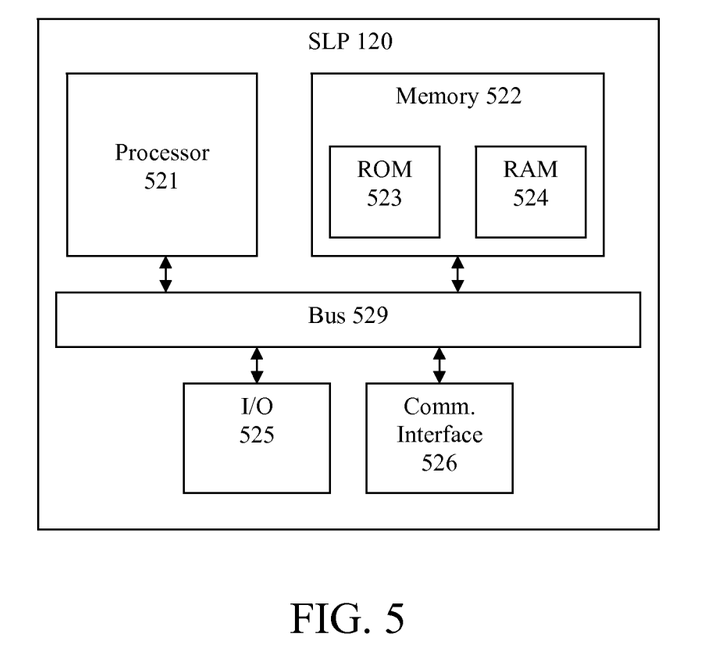
FIG. 5 is a functional block diagram illustrating a processing device for establishing and maintaining a triggered session for location determination of a mobile device based on a conditional trigger, according to a representative embodiment.

The various process steps described with reference to FIG. 4 may be performed by a processing device or server, such as the SLP 120, or when the SLP 120 includes clustering, one or more of the SLP nodes 121-123. FIG. 5 is a functional block diagram illustrating such a processing device (e.g., indicated for purposes of explanation as SLP nodes 120), which is configured to execute an algorithm and/or process for maintaining session state in a SUPL enabled system during a triggered session, according to a representative embodiment. Although the SLP 120 is shown and discussed below, it is understood that other servers, computers or nodes, such as each of the SLP nodes 121-123 and/or the SET 130, may be configured in a similar manner, at least with respect to processing and storage functionality.

The various "parts" shown in the SLP 120 may be physically implemented using a software-controlled controller or microprocessor, e.g., processor 521, hard-wired logic circuits, firmware, or a combination thereof. Also, while the parts are functionally segregated for explanation purposes, they may be combined variously in any physical implementation.

In the depicted embodiment, the SLP 120 includes processor 521, memory 522, bus 529 and various interfaces 525-526. The processor 521 is configured to execute one or more logical or mathematical algorithms, including maintaining session state in a SUPL enabled system, as well as position calculation processes, of the embodiments described herein, in conjunction with the memory 522. The processor 521 may also execute basic functionality for controlling geographic location determination processes for locating mobile devices. The processor 521 may be constructed of any combination of hardware, firmware or software architectures, and include its own memory (e.g., nonvolatile memory) for storing executable software/firmware executable code that allows it to perform the various functions. Alternatively, the executable code may be stored in designated memory locations within memory 522, discussed below. In an embodiment, the processor 521 may be a central processing unit (CPU), for example, and may execute an operating system.

The memory 522 may be any number, type and combination of external and internal nonvolatile read only memory (ROM) 523 and volatile random access memory (RAM) 524, and stores various types of information, such as signals and/or computer programs and software algorithms executable by the processor 521 (and/or other components). As generally indicated by ROM 523 and RAM 524, the memory 522 may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like.

In addition, the SLP 120 includes one or more communication interfaces, indicated by representative communications interface 526, to enable communications with one or more components of the wireless communications network 100. For example, the communications interface 526 enables communications with mobile devices (e.g., SET 130) or other GNNC receivers, through base stations or node Bs. In addition, the communications interface 526 also enables communicates with various sources, such as the location client 110. The communications may be provided to the processor 521 and/or the memory 522 via bus 529. In various embodiments, the communication interface 526 includes one or more types of interfaces, such as wireless or wired Ethernet, TCP, ATM, or MTP, for example. However, the number, types and arrangement of interfaces may vary without departing from the scope of the present teachings.

A user and/or other computers may interact with the SLP 12—using various input device(s) through I/O interface 525. The input devices may include a keyboard, key pad, a track ball, a mouse, a touch pad or touch-sensitive display, and the like. Also, various information may be displayed on a display (not shown) through a display interface (not shown), which may include any type of graphical user interface (GUI).

In various embodiments, the process steps depicted FIG. 4 may be incorporated within one or more processing modules of a device, such as the SLP 120 and/or the SET 130 depicted in FIG. 1. However, the modules may be executable by any other server, computer or node having access to the location client 110 and/or the SET 130, without departing from the scope of the present teachings. The modules may be implemented as any combination of software, hard-wired logic circuits and/or firmware configured to perform the designated operations. Software modules, in particular, may include source code written in any of a variety of computing languages, such as C++, C# or Java, and are stored on tangible computer readable storage media, such the computer readable storage media discussed above with respect to memory 522, for example.

Generally, in accordance with various embodiments, a location server establishes a triggered session with a mobile device at the request of a location client, so that the mobile device provides triggered messages, which may include the geographic location of the mobile device, in response to one or more trigger events. State data is provided by the location server to the mobile device via modified session messaging, so that state is maintained only by the mobile device. For example, free bits in existing fields of a session ID parameter may be used to convey the state data to the mobile device. The state data is returned to the location server in one or more triggered messages, along with the geographic location of the mobile device and/or measurement information from which the geographic location may be determined. Security of the state data may be ensured, for example, by encrypting the state data and/or key identifiers provided to the mobile device.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method of maintaining session state in a Secure User Plane Location (SUPL) enabled system, the method comprising:
   modifying at least one parameter of a session message to include state data necessary to maintain session state of a triggered session;
   transmitting a request to a SUPL Enabled Terminal (SET) over a given communication channel to initiate the triggered session, the request comprising the session message having the at least one modified parameter, enabling the state data to be stored at the SET;
   closing the given communication channel after the session message is received at the SET;
   clearing the state data from memory of the SUPL enabled system in response to the closing, wherein the SET maintains the only copy of the state data;
   receiving a triggered message from the SET over another communication channel in response to occurrence of a trigger event detected by the SET during the triggered session, the triggered message comprising the stored state data;
   re-establishing the triggered session using the state data received in the triggered message;
   receiving a SUPL POS message from the SET, the SUPL POS message including position data indicating a location of the SET; and
   setting an estimated position of the SET using the position data in the SUPL POS message.

2. The method of claim 1, further wherein the setting further comprises calculating the estimated position of the SET using the position data.

3. The method of claim 2, further comprising:
   initially receiving a request from a location client to initiate the triggered session with the SET; and
   sending the calculated estimated position of the SET to the location client.

4. The method of claim 1, wherein the session message transmitted to the SET comprises a SUPL NIT message.

5. The method of claim 4, wherein the at least one modified parameter comprises a SlpSessionID parameter.

6. The method of claim 5, wherein modifying the at least one parameter of the session message to include state data indicating the session state comprises setting free bits in at least one of a sessionID field and a slpID field of the SlpSessionID parameter to include the state data.

7. The method of claim 1, wherein the triggered message received from the SET comprises one of a SUPL REPORT message or a SUPL POS INIT message.

8. The method of claim 1, wherein modifying the at least one parameter of the session message comprises:
   encrypting the state data included in the at least one modified parameter, wherein the SET stores the encrypted state data, and is incapable of decrypting the encrypted state data.

9. The method of claim 8, wherein the at least one modified parameter includes a key identifier that identifies a key known only to a SUPL Location Platform (SLP).

10. The method of claim 8, wherein re-establishing the triggered session comprises decrypting the state data received in the triggered message.

11. The method of claim 1, wherein modifying the at least one parameter of the session message comprises:
   including a message authentication code, and not encrypting the state data included in the at least one modified parameter, wherein the SET stores the unencrypted state data and message authentication code.

12. The method of claim 11, wherein the at least one modified parameter includes a key identifier that identifies a key known only to a SUPL Location Platform (SLP).

13. The method of claim 11, wherein re-establishing the triggered session comprises using the key identifier to identify an encryption key, and performing the cryptographic hash function using the identified encryption key, and verifying that the state data received in the triggered message has not been altered using the cryptographic hash function.

14. The method of claim 1, wherein the receiving and the re-establishing occur after the closing.

15. The method of claim 1, wherein the receiving and the re-establishing occur at least one hour after the closing.

16. The method of claim 1, wherein the modifying is performed at a SULP location platform (SLP).

17. A non-transitory computer readable medium storing code executable by a computer processor for maintaining session state in a Secure User Plane Location (SUPL) enabled system, the computer readable medium comprising:
   a modifying code segment for modifying at least one parameter of a session message to include state data necessary to maintain session state of a triggered session;
   a transmitting code segment for enabling transmission of a request to a SUPL Enabled Terminal (SET) to initiate the triggered session over a given communication channel, the request comprising the session message having the at least one modified parameter, enabling the state data to be stored at the SET;
   a closing code segment for closing the given communication channel after the session message is received by the SET;
   a clearing code segment for clearing the state data from memory of the SUPL enabled system in response to the closing, wherein the SET maintains the only copy of the state data;
   a receiving code segment for receiving a triggered message from the SET over another communication channel in response to occurrence of a trigger event detected by the SET during the triggered session, the triggered message comprising the stored state data; and
   an identifying code segment for re-establishing the triggered session using the state data received in the triggered message;
   wherein the receiving code segment is for receiving a SUPL POS message from the SET, the SUPL POS message including position data indicating a location of the SET and setting an estimated position of the SET using the position data in the SUPL POS message.

18. The computer readable medium of claim 17, further comprising:
   a calculating code segment for calculating the estimated position of the SET using position data.

19. The computer readable medium of claim 17, wherein the session message comprises a SUPL INIT message.

20. The computer readable medium of claim 19, wherein the at least one modified parameter comprises a SlpSessionID parameter.

21. The computer readable medium of claim 20, wherein the modifying code segment modifies the at least one parameter by comprises setting free bits in at least one of a sessionID field and a slpID field of the SlpSessionID parameter to include the state data.

22. The computer readable medium of claim 17, further comprising:
   an encrypting code segment for encrypting the state data included in the at least one modified parameter, wherein the SET stores the encrypted state data, and is incapable of decrypting the encrypted state data.

23. A method of maintaining session state in a Secure User Plane Location (SUPL) enabled system during a triggered session, without a SUPL Location Platform (SLP) maintaining state necessary to re-establish the triggered session, the method comprising:
   setting free bits of a SlpSessionID parameter in a session message at the SLP to include state data necessary to maintain the session state of the triggered session;
   transmitting the session message a SUPL Enabled Terminal (SET) from the SLP to the SET to initiate the triggered session over a given communication channel, the SET storing the free bits of the SlpSessionID;
   closing the given communication channel after the SET receives the session message;
   clearing the state data from memory of the SLP in response to the closing, wherein the SET maintains the only copy of the state data;
   receiving a SUPL POS INIT message from the SET over another communication channel upon occurrence of a trigger event to initiate position determination as part of the triggered session, the SUPL POS INIT message comprising the stored state data;
   re-establishing the triggered session using the stored data in the SUPL POS INIT message;
   receiving a SUPL POS message from the SET, the SUPL POS message including position data indicating a location of the SET; and
   calculating an estimated position of the SET using the position data in the SUPL POS message.

24. The method of claim 23, wherein the setting free bits of the SlpSessionID parameter comprises modifying the SlpSessionID parameter by setting free bits in at least one of a sessionID field and a slpID field of the SlpSessionID parameter to include the state data.

25. The method of claim 23, wherein the setting free bits of the SlpSessionID parameter comprises modifying the SlpSessionID parameter by setting free bits in an FQDN in a slpID field.

* * * * *